US012561193B2

(12) United States Patent
Dande et al.

(10) Patent No.: US 12,561,193 B2
(45) Date of Patent: Feb. 24, 2026

(54) CRYPTOGRAPHIC HASH SIGNATURE FOR ERROR PATTERN RECOGNITION WITH AN AUTOMATED RECOVERY FRAMEWORK

(71) Applicant: BANK OF AMERICA CORPORATION, Charlotte, NC (US)

(72) Inventors: Pratap Dande, Saint Johns, FL (US); Elvis Nyamwange, Little Elm, TX (US); Sarveshwar Kuncha, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/628,386

(22) Filed: Apr. 5, 2024

(65) Prior Publication Data

US 2025/0315337 A1 Oct. 9, 2025

(51) Int. Cl.
*G06F 11/07* (2006.01)
*G06F 11/10* (2006.01)
*H04L 9/06* (2006.01)

(52) U.S. Cl.
CPC ........ *G06F 11/079* (2013.01); *G06F 11/0709* (2013.01); *G06F 11/0793* (2013.01); *G06F 11/1004* (2013.01); *H04L 9/0643* (2013.01)

(58) Field of Classification Search
CPC .............. G06F 11/0709; G06F 11/079; G06F 11/0793; G06F 11/1004; H04L 9/0643
See application file for complete search history.

(56) References Cited

U.S. PATENT DOCUMENTS

| | | | |
|---|---|---|---|
| 9,904,587 B1 * | 2/2018 | Potlapally | G06F 11/079 |
| 10,291,657 B2 | 5/2019 | Narayanaswamy | |
| 11,249,833 B2 * | 2/2022 | Singh | G06F 11/302 |
| 11,269,884 B2 | 3/2022 | Miller | |
| 11,431,488 B1 | 8/2022 | Sapuntzakis | |
| 11,500,788 B2 | 11/2022 | Miller | |
| 11,614,881 B2 | 3/2023 | Fay | |
| 11,632,360 B1 | 4/2023 | Tan | |
| 11,651,075 B2 | 5/2023 | Karr | |
| 11,687,418 B2 | 6/2023 | Baker | |
| 11,720,691 B2 | 8/2023 | Borowiec | |
| 11,893,023 B2 | 2/2024 | Colgrove | |

(Continued)

*Primary Examiner* — Joseph R Kudirka
(74) *Attorney, Agent, or Firm* — Moore & Van Allen PLLC; Nicholas C. Russell

(57) ABSTRACT

Systems, computer program products, and methods are described for a cryptographic hash signature architecture aimed at error pattern recognition and automated recovery. This framework receives live error data, generates unique cryptographic hash signatures (checksums), and matches these against a stored checksum database to identify known error patterns. If a match exists, predefined scripts execute corrective actions. Otherwise, machine learning algorithms assess the error to suggest solutions. The system employs a rules engine applying predefined algorithms to ensure solutions match system protocols. It updates a historical database with error and resolution data, refining the knowledge base. Successful resolutions are verified, with outcomes enhancing the machine learning model's future accuracy. This innovative approach boosts system reliability and user satisfaction by reducing manual interventions and downtime.

20 Claims, 6 Drawing Sheets

(56) References Cited

U.S. PATENT DOCUMENTS

| | | |
|---|---|---|
| 11,936,654 B2 | 3/2024 | Hu |
| 2021/0216408 A1 | 7/2021 | Huskisson |
| 2021/0216625 A1 | 7/2021 | Miller |
| 2021/0216633 A1 | 7/2021 | Lee |
| 2021/0216646 A1 | 7/2021 | Miller |
| 2021/0216648 A1 | 7/2021 | Child |
| 2021/0216666 A1 | 7/2021 | Miller |
| 2021/0397711 A1 | 12/2021 | Karr |
| 2022/0014423 A1 | 1/2022 | Smith |
| 2022/0092180 A1 | 3/2022 | Richardson |
| 2023/0099700 A1* | 3/2023 | Angelo ............... G06F 9/45558 714/37 |

* cited by examiner

400

SYSTEM INITIATES ERROR HANDLING BY RECEIVING LIVE DATA, WHICH INCLUDES ENCOUNTERING AN ERROR THAT REQUIRES PROCESSING AND RESOLUTION
402

CHECKSUM ENGINE GENERATES A UNIQUE CRYPTOGRAPHIC HASH SIGNATURE FOR THE RECEIVED ERROR, EFFECTIVELY CONVERTING THE ERROR DATA INTO A DISTINCT CHECKSUM FOR EFFICIENT INDEXING AND RETRIEVAL
404

MATCHING ENGINE COMPARES THE GENERATED CHECKSUM AGAINST A DATABASE OF STORED CHECKSUMS TO IDENTIFY IF THE ERROR PATTERN IS KNOWN
406

MACHINE LEARNING ALGORITHMS UTILIZED TO ANALYZE THE CHECKSUM AND RECOGNIZE ERROR PATTERNS, ENHANCING THE PRECISION OF MATCHING AND IDENTIFICATION OF POTENTIAL SOLUTIONS FROM HISTORICAL DATA
408

UPON SUCCESSFUL PATTERN RECOGNITION, THE SYSTEM TRIGGERS PREDEFINED AUTOMATED EXECUTION SCRIPTS THAT CORRESPOND TO THE IDENTIFIED ERROR PATTERN FOR IMMEDIATE CORRECTIVE ACTION.
410

THE RULES ENGINE PROCESSES THE ERROR BY APPLYING A SET OF PREDEFINED RULES AND ALGORITHMS, ENSURING THAT THE CHOSEN SOLUTION ALIGNS WITH SYSTEM PROTOCOLS AND THE NATURE OF THE ERROR
412

SYSTEM UPDATES THE HISTORICAL DATABASE OF ERRORS AND EXCEPTIONS WITH NEW ERROR DATA AND RESOLUTION DETAILS, THUS ENRICHING THE SYSTEM'S KNOWLEDGE BASE FOR FUTURE OCCURRENCES
414

VERIFY THE SUCCESSFUL RESOLUTION OF THE ERROR AND FEEDING BACK THE OUTCOME INTO THE ML MODEL TO REFINE FUTURE ERROR HANDLING AND PATTERN RECOGNITION CAPABILITIES
416

FIGURE 4

CRYPTOGRAPHIC HASH SIGNATURE FOR ERROR PATTERN RECOGNITION WITH AN AUTOMATED RECOVERY FRAMEWORK

TECHNOLOGICAL FIELD

Example embodiments of the present disclosure relate to a cryptographic hash signature architecture for error pattern recognition with an automated recovery framework.

BACKGROUND

The evolution of self-service systems across various sectors has significantly reduced the need for direct human intervention in process workflows. However, such systems are not immune to errors, which can impede service provision, leading to user frustration and affecting critical timelines. Traditional methods for managing these errors often require manual identification and resolution processes, which can be time-consuming and prone to further error. Additionally, the inability of these systems to learn from historical errors means similar issues continue to arise without a preemptive mitigation strategy. The present invention addresses these shortcomings by introducing a novel framework for error management utilizing cryptographic hash signatures to enhance automated recovery systems.

Applicant has identified a number of deficiencies and problems associated with automated recovery frameworks. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for a cryptographic hash signature architecture for error pattern recognition and automated recovery framework.

The present disclosure provides an innovative framework for identifying and resolving errors in self-service systems. Utilizing cryptographic hash signatures, the invention assigns unique checksum values to errors, enabling the system to recognize patterns and respond with pre-determined corrective actions. This process not only facilitates quicker resolution of individual errors but also improves the system's capacity to proactively address errors before they affect end-users. By incorporating a rules engine and a matching engine, the system can learn from each incident, adapting its response mechanism to be more effective over time. Such an architecture not only increases the efficiency and reliability of self-service systems but also significantly enhances user satisfaction by minimizing disruptions and downtime.

As such, embodiments of the invention relate to systems, methods, and computer program products for error pattern recognition and automated recovery, the invention including the general steps of: receiving live error data indicating an error within a self-service system; generating a unique cryptographic hash signature based on the received live error data; employing a machine learning algorithm to analyze the checksum and recognize an error pattern; comparing the unique cryptographic hash signature against a database of stored checksums to identify if the error pattern is known; triggering a predefined automated execution script corresponding to the error pattern for immediate corrective action; processing the error pattern via applying a set of predefined rules to ensure a chosen solution aligns with system protocols and the nature of the error; updating a historical database of errors and exceptions with new error data and resolution details; and verifying a successful resolution of the error pattern and feeding back an outcome into the machine learning model to refine future error handling and pattern recognition capabilities.

In some embodiments, the system is further configured to utilize a rules engine for applying the set of predefined rules and algorithms, wherein the rules engine processes the error based on the context and characteristics of the identified error to select an appropriate resolution method.

In some embodiments, the machine learning algorithms include at least one of supervised learning, unsupervised learning, semi-supervised learning, or reinforcement learning to facilitate the recognition of the error pattern and the identification of resolution strategies.

In some embodiments, the system is further configured to employ a data pre-processing engine to standardize and prepare live data for analysis, the data pre-processing engine performing tasks including normalization, cleaning, and transformation of the data.

In some embodiments, the automated execution scripts are implemented in at least one scripting language selected from the group consisting of Bash, PowerShell, and Python, and are designed to interact with various system components across different operating systems.

In some embodiments, the system is further configured to: maintain the database of stored checksums via adding new checksums associated with newly encountered errors and their resolution outcomes.

In some embodiments, the system includes a feedback mechanism configured to capture data on the success or failure of applied resolution strategies, analyze the data on the success or failure of applied resolution strategies, and utilize the data on the success or failure of applied resolution strategies to inform future error handling.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
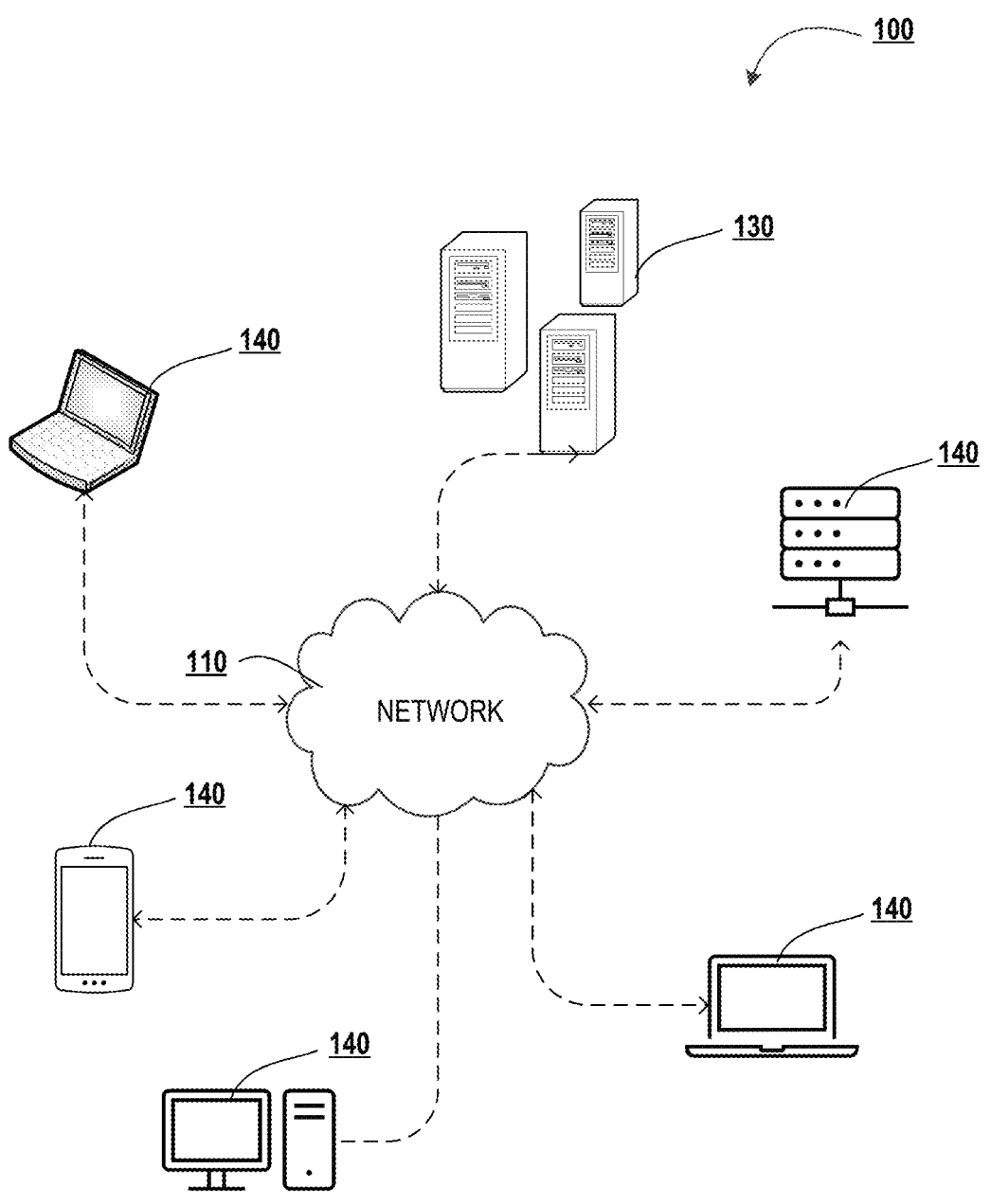
Figure 1B:
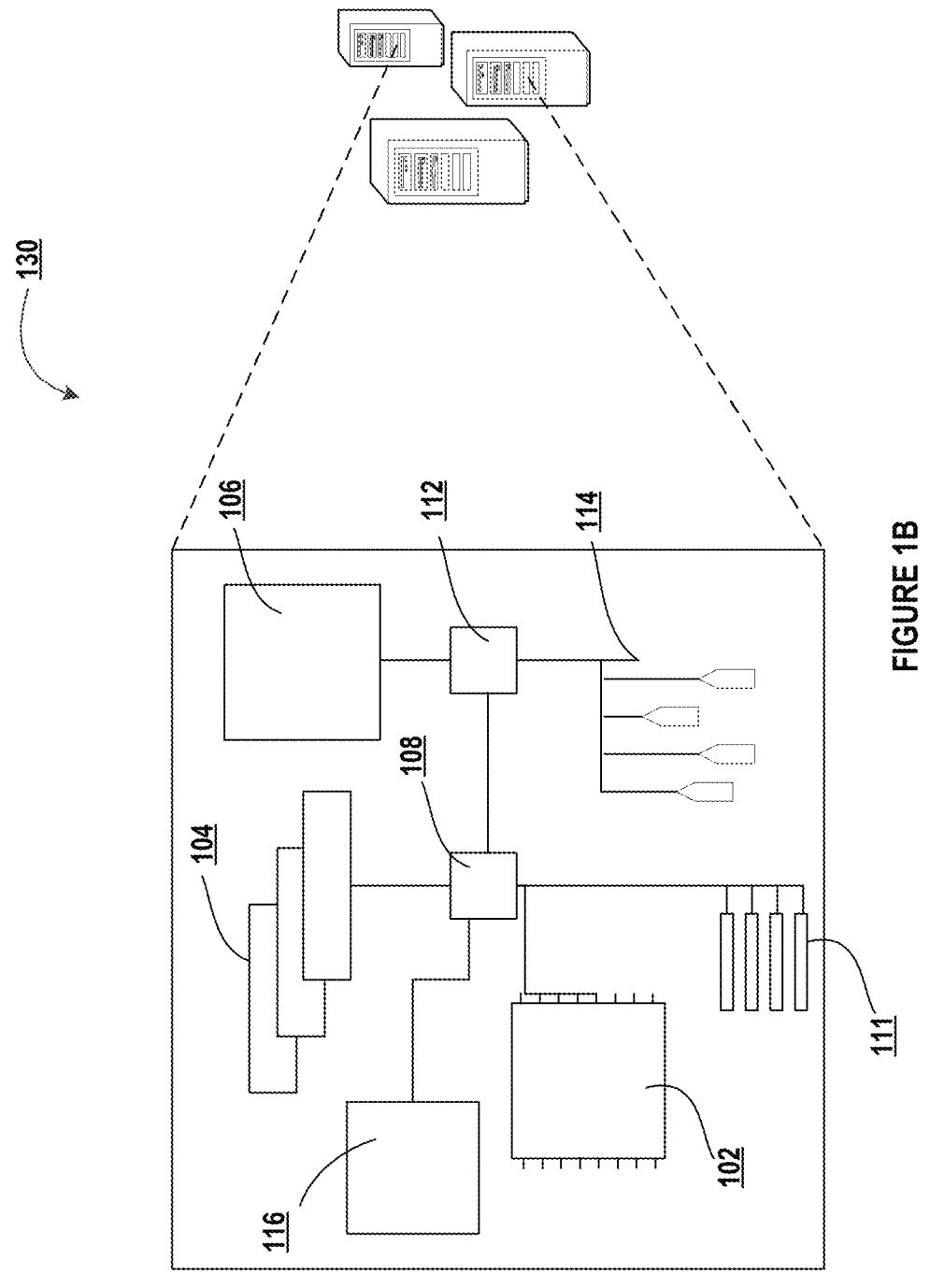
Figure 1C:
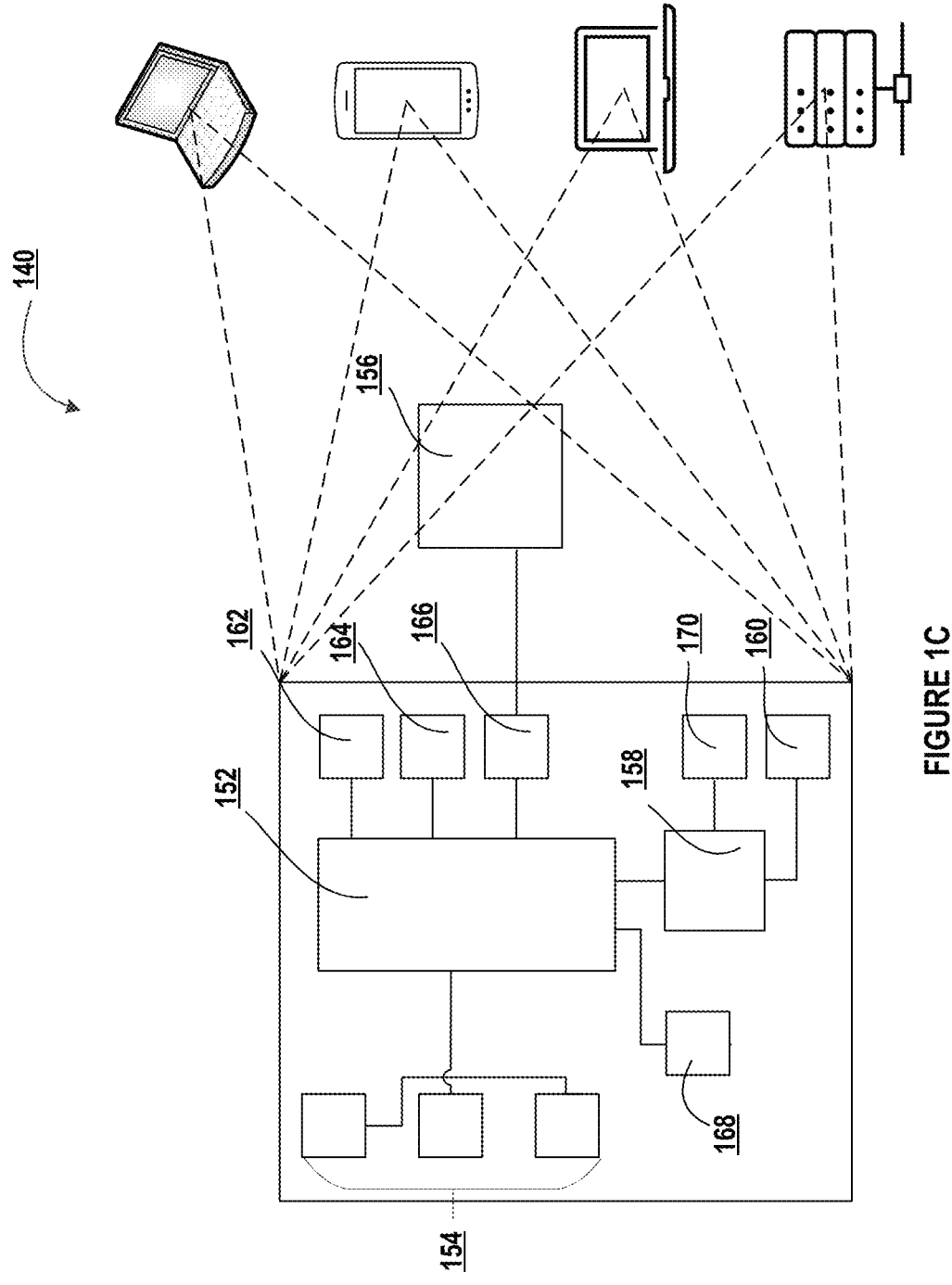
Figure 2:
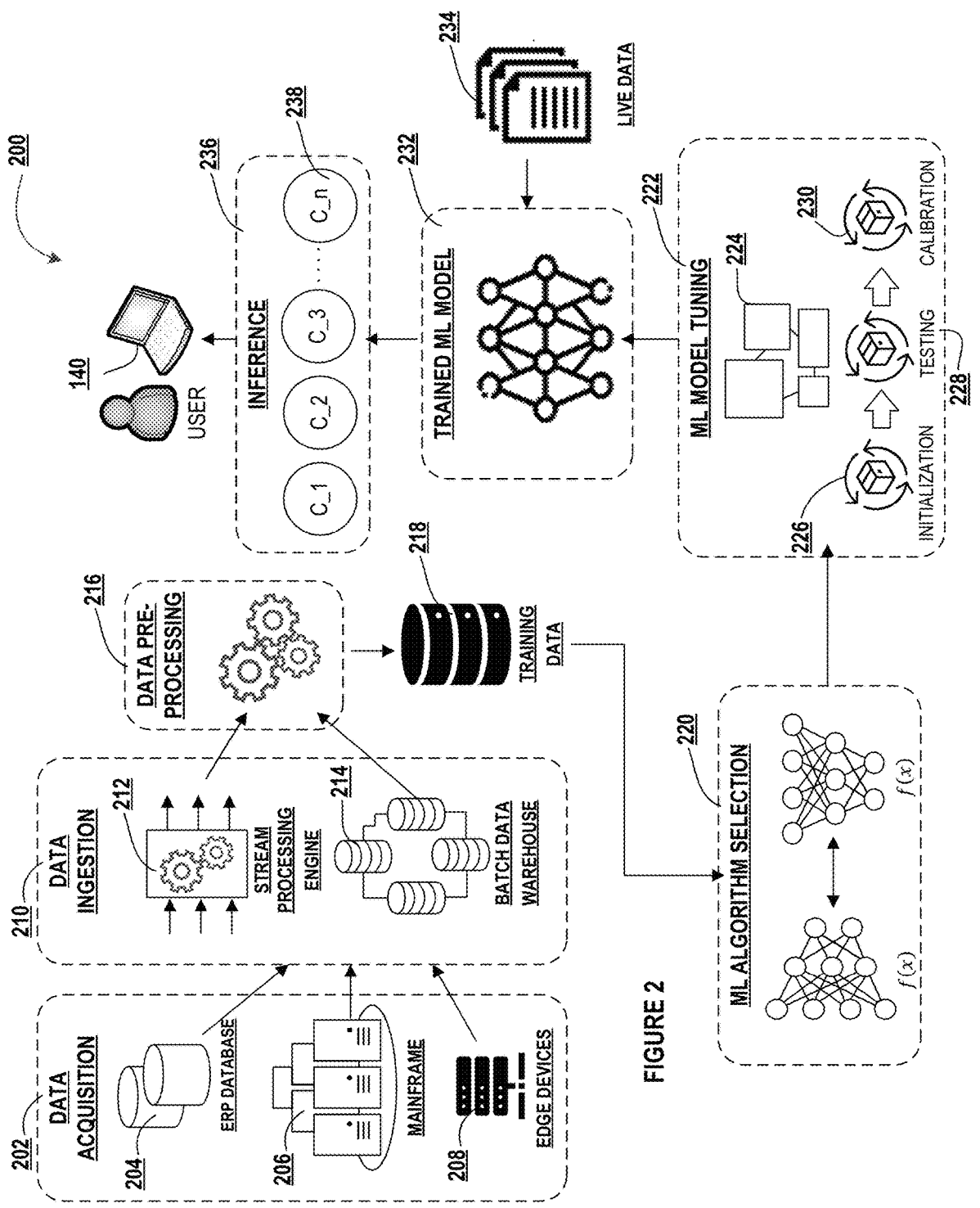
Figure 3:
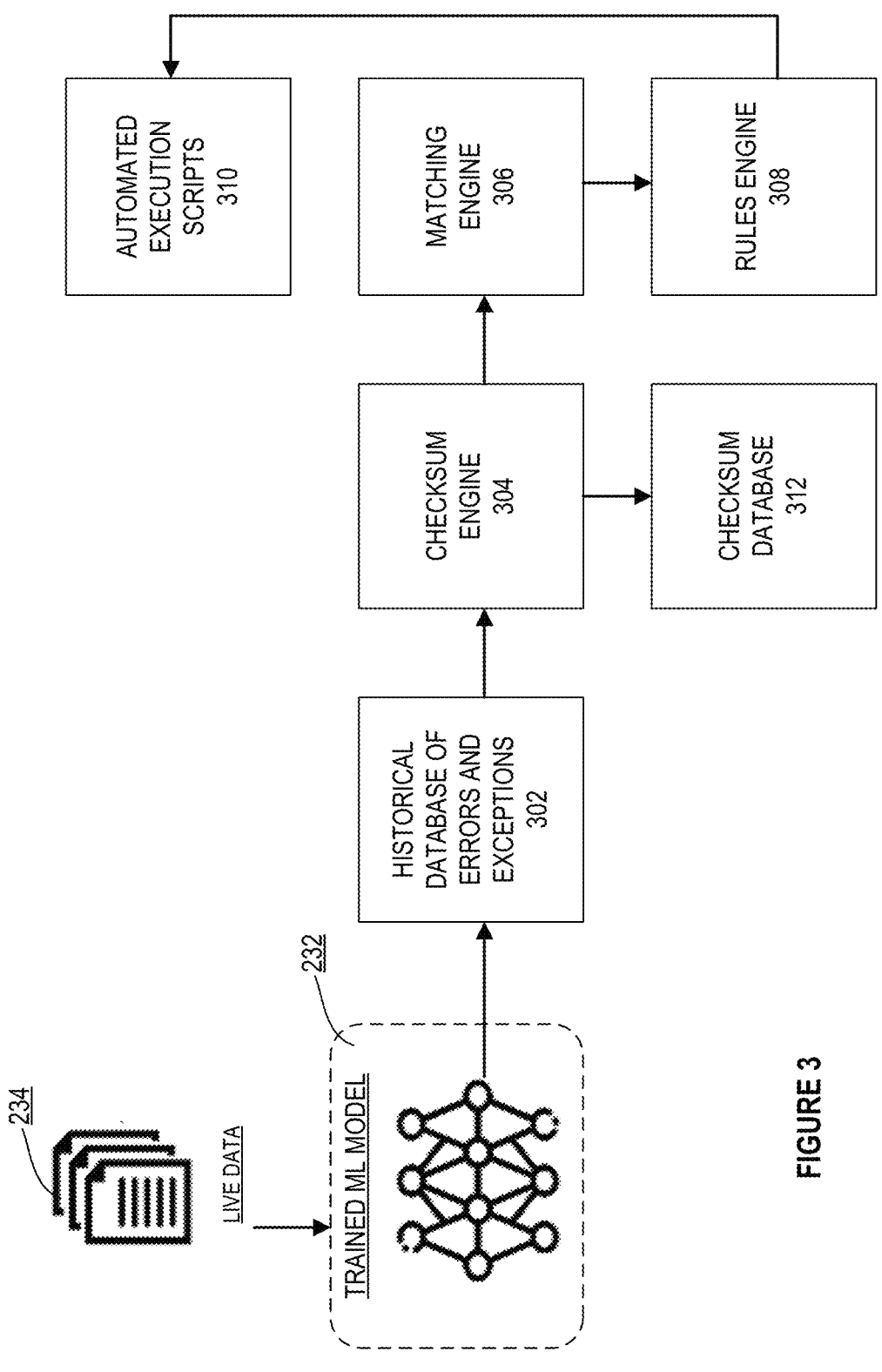

FIGS. 1A-1C illustrates technical components of an exemplary distributed computing environment for cryptographic hash signature architecture for error pattern recognition and automated recovery framework, in accordance with an embodiment of the disclosure;

FIG. 2 illustrates an exemplary machine learning (ML) subsystem architecture 200, in accordance with an embodiment of the invention;

FIG. 3 illustrates an exemplary process flow diagram 300 for a cryptographic hash signature architecture for error pattern recognition and automated recovery framework, in accordance with an embodiment of the invention; and FIG. 4 illustrates a process flow for cryptographic hash signature architecture for error pattern recognition and automated recovery framework, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "checksum" may generally refer to a unique alphanumeric representation of error data generated by a cryptographic algorithm. This transformation is designed to produce a concise, fixed-size summary of the original error message or data set, facilitating efficient error identification, comparison, and retrieval processes within the system. Checksums serve as digital fingerprints for errors, ensuring that each error can be uniquely identified and matched against a database of known issues, regardless of the error's complexity or source.

As used herein, "matching engine" may generally refer to a software component that compares checksums against a database to identify known error patterns. This engine employs sophisticated algorithms to scan through a repository of previously encountered errors, searching for checksums that match the one generated for a current error. When a match is found, the engine retrieves the associated resolution strategies or historical data, enabling the system to apply proven solutions to resolve current errors efficiently.

As used herein, "rules engine" may generally refer to a system that processes errors by applying predefined rules and algorithms to determine corrective actions. The rules engine interprets the context and characteristics of identified errors, deciding on the most appropriate resolution method based on a set of logical conditions or rules. These rules can be complex, covering a wide range of error scenarios and solution pathways, and are designed to align the chosen solution with the specific requirements and protocols of the system environment.

As used herein, "machine learning model" may generally refer to an algorithmic construct that enables the system to learn from data and improve its error handling over time. This model analyses historical error data and outcomes to discern patterns and predict the most effective resolution strategies for new errors. Over time, through continuous learning and adaptation, the model becomes increasingly adept at identifying errors and suggesting corrective actions, thereby enhancing the system's overall efficiency and reliability.

As used herein, "automated execution scripts" may generally refer to pre-written code sequences that are triggered to resolve errors based on pattern recognition. These scripts are designed to perform specific tasks or series of actions automatically when an error matching a known pattern is identified. The scripts can range from simple commands to complex sequences that interact with various system components, effectively implementing the corrective measures identified by the system without requiring manual intervention.

As used herein, "historical database" may generally refer to a repository that stores error patterns and their resolutions to aid in machine learning and error resolution. This database serves as a comprehensive archive of all errors encountered by the system, along with details about how each was resolved. By maintaining this information, the database enables the system to learn from past experiences, applying successful strategies to new errors and continuously refining its understanding of error patterns.

As used herein, "error pattern recognition" may generally refer to a process where machine learning algorithms identify and match error signatures to known issues. This involves analyzing the unique characteristics of an error, such as its checksum, to determine if it corresponds to any previously encountered errors. By recognizing these patterns, the system can quickly apply known solutions to current errors, streamlining the resolution process.

As used herein, "live data" may generally refer to real-time information collected from the system, including error instances that require resolution. This data captures the current state of the system and its interactions, providing immediate, actionable insights into operational issues as they occur. Live data is essential for the timely detection and handling of errors, ensuring that the system can respond rapidly to prevent or minimize disruption.

As used herein, "data pre-processing engine" may generally refer to a component that standardizes and prepares live data for analysis by the machine learning model. This engine processes incoming data, performing tasks such as normalization, cleaning, and transformation to ensure that the data is in a suitable format for analysis. By preparing the data in this way, the engine facilitates more accurate and efficient error pattern recognition and resolution strategy identification.

As used herein, "feedback loop" may generally refer to a mechanism that allows the system to learn from the outcomes of resolved errors to enhance future performance. This loop involves capturing data on the success or failure of applied resolution strategies, analyzing this data to understand the effectiveness of different approaches, and using these insights to inform future error handling processes. The feedback loop is a critical component of the system's continuous improvement cycle, enabling it to adapt and evolve in response to new challenges and information.

The technology at the core of this invention represents a paradigm shift in error management and resolution within self-service systems. By employing cryptographic hash signatures, it creates a robust framework that turns each error into a unique digital fingerprint. This allows the system to handle errors not as mere nuisances but as data points that can be analyzed, categorized, and resolved through an intelligent, automated process. In the field of self-service system management, errors are not just common; they are expected. These errors can arise from various sources and often lead to system downtime, affecting user productivity and satisfaction. The challenge lies in promptly identifying these errors, understanding their nature, and resolving them without requiring users to go through tedious, repetitive processes.

Accordingly, the present disclosure outlines an automated system that uses a unique combination of cryptographic techniques to identify errors as they occur and implement a resolution. The process involves generating a digital signature for each error, matching it against a database of known issues, and applying a fix without needing manual oversight. Over time, the system refines its ability to detect and resolve issues, thereby becoming more efficient and reducing system downtime.

What is more, the disclosed technology provides a technical solution to a technical problem inherent in self-service systems. Specifically, the technical problem involves the timely and accurate identification and resolution of errors, which could otherwise lead to prolonged system outages and poor user experiences. The technical solution leverages a novel use of cryptographic hashing to create unique error signatures, which are then used to automate the process of error pattern recognition and resolution. This solution enhances existing error management processes by (i) streamlining the resolution process, thereby reducing computational overhead, (ii) increasing the accuracy of error identification, which in turn minimizes resource-intensive corrective actions, (iii) eliminating the need for manual error handling, thus improving the speed and efficiency of the overall system, and (iv) optimizing resource allocation for error resolution, thereby decreasing network congestion and server load. Moreover, this technical solution adopts a rigorous computational procedure to carry out tasks previously unattainable, bypassing redundant steps and, as a result, conserving valuable computing resources.

FIGS. 1A-1C illustrate technical components of an exemplary distributed computing environment 100 for cryptographic hash signature architecture for error pattern recognition and automated recovery framework, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link);

the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236. This subsystem is integral to the error pattern recognition process of the present invention, utilizing a machine learning approach to improve the precision and efficiency of automated recovery actions.

The data acquisition engine 202 may identify various internal and/or external data sources to generate, test, and/or integrate new features for training the machine learning model 224. These features may include unique checksum values and error metadata that enable the ML model to identify patterns indicative of recurring errors. These internal and/or external data sources 204, 206, and 208 may be initial locations where the data originates or where physical information is first digitized. In this context, the data sources are error logs, user feedback, and system performance metrics that feed into the ML subsystem for pattern detection and subsequent learning. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. In the present system, data variability is key as errors come in diverse forms, requiring robust ingestion capabilities that can handle structured and unstructured data seamlessly for optimal ML training. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. It is understood that the data pre-processing engine 216 plays a crucial role in the invention by ensuring that the checksum-based error signatures are properly formatted and normalized to enable the ML model to accurately learn from past errors and predict or suggest corrective actions for new ones. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. In the present system, these techniques are applied to extract and select features based on the unique checksum values, which are indicative of the underlying error characteristics. This allows the ML model to focus on the most informative aspects of the errors for more effective learning and pattern recognition. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. In the present system, model tuning is guided by the success rate of the automated recovery actions, which is used as feedback to continuously refine the model's predictive accuracy and recovery efficiency. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. In the context of the present invention, these algorithms are selected and adapted to process the checksum-based error signatures and to train the ML model to match these with effective recovery strategies, effectively applying pattern recognition to automatically resolve or escalate issues as needed, or the like. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. Within the present system, the iterative tuning process is vital to evolve the error resolution logic, thereby reducing the number of steps needed for problem-solving and enhancing the decision-making capabilities of the automated recovery framework. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1$, $C\_2$ . . . . $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2$ . . . . $C\_n$ 238) live data 234 based on how similar they are to one another to solve exploratory challenges where little is known about the data, provide a description or label (e.g., $C\_1$, $C\_2$ . . . . $C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes. In the present framework, once the ML model is trained, it is employed within the recovery system to continuously assess and respond to errors in real-time, harnessing the power of machine learning to significantly enhance the self-healing capabilities of self-service systems.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates an exemplary process flow diagram 300 for a cryptographic hash signature architecture for error pattern recognition and automated recovery framework, in accordance with an embodiment of the invention. The invention disclosed herein provides a method and system for identifying and resolving errors in self-service systems using a machine learning model (ML) to automate error recovery. Referring to FIG. 3, the process begins with the trained ML model 232, which has been previously trained on historical error data to recognize and interpret error patterns. This model is critical in the initial diagnosis of live data errors 234 as they occur in real-time.

Live data errors 234 are first passed through the trained ML model 232, which utilizes advanced algorithms and computational techniques, as described in FIG. 2, to analyze and compare current error instances against a historical database of errors and exceptions 302. The historical database of errors and exceptions 302 is a repository that has been populated with past errors and their resolutions, forming a knowledge base that the ML model 232 leverages to understand and predict error characteristics. Once the trained ML model 232 has processed the live data errors 234, it interfaces with the checksum engine 304. The checksum engine 304 employs cryptographic algorithms to assign a unique checksum to each error. The algorithms used can include, but are not limited to, MD5, SHA-1, or SHA-256, or the like, depending on the required level of uniqueness and security considerations. This conversion of error data into a checksum format is crucial for efficiently storing and retrieving error information within the checksum database 312.

Following the generation of a checksum, the matching engine 306 is initiated. This matching engine 306 compares the newly generated checksum with existing checksums within the checksum database 312. The matching engine 306, through pattern recognition algorithms, identifies whether the checksum corresponds to known errors. If a match is found, it suggests potential solutions based on past instances. It is understood that the functionality of the matching engine 306 is at the core of the system's error recognition and resolution process. Upon receiving a unique checksum from the checksum engine 304, the matching engine 306 employs sophisticated pattern recognition algorithms to determine if this checksum correlates with an error pattern previously encountered and cataloged in the checksum database 312.

These pattern recognition algorithms may include various machine learning models such as neural networks, decision trees, or support vector machines that have been trained on historical error data. The algorithms compare the checksum's digital signature against a dataset of checksums associated with known errors and their solutions. The complexity of these comparisons requires that the algorithms be adept at recognizing not only identical matches but also similar patterns that could indicate a recurring problem or a variant of a previously documented error.

If a match is found, the matching engine 306 retrieves the associated resolution protocol from the database. This protocol could be a straightforward corrective measure, such as restarting a service, or a complex series of actions requiring numerous steps, which are encoded within the automated execution scripts 310. The solution may also include a variety of metadata associated with the error, such as urgency, affected system components, and success rate of the previous resolution, which are used to prioritize and execute recovery tasks, or the like.

In cases where the checksum partially matches multiple known errors, the matching engine 306 might use a scoring system to rate the potential matches based on their similarity. The system could then either choose the highest scoring match to apply the associated solution or employ a heuristic approach to combine elements from several potential solutions to form a new, composite resolution strategy. The ability of the matching engine 306 to suggest potential solutions is an iterative and adaptive process. It is continually refined as the trained ML model 232 processes new errors and outcomes, thus expanding the historical database of errors and exceptions 302 and the checksum database 312. Over time, this results in an increasingly sophisticated understanding of error patterns, making the system more effective at suggesting accurate resolutions and minimizing system downtime.

In implementing this process, the matching engine 306 operates in conjunction with the rest of the system architecture to ensure that error resolutions are not only suggested but also executed efficiently, with minimal impact on the system's performance and the user experience. This integrated approach underscores the system's capacity for self-improvement and automation, emphasizing the inventive steps that provide a technical solution to technical problems in the field of error management within self-service systems.

In instances where the error can be matches based in its checksum, the rules engine 308 is engaged. The rules engine 308 contains a set of predefined rules and algorithms, written in high-level programming languages such as Python or Java, that can make logical decisions regarding error handling based on known errors that are matched based on the checksum values. Depending on the complexity of the error, the rules engine 308 may execute one or more automated execution scripts 310 based on multiple matches checksum values. It is understood that these scripts are sets of coded instructions that implement fixes, adjustments, or other necessary actions to resolve the error. The scripts can be written in a variety of scripting languages such as Bash, PowerShell, or Python, chosen for their ability to interface with various system components and execute tasks across different operating systems.

It is understood that the entire process is supported by a robust hardware infrastructure, which may include multi-core servers, redundant storage systems, and high-speed network interfaces to ensure high availability and scalability. The flow of data from live error detection to resolution is meticulously logged and monitored, providing valuable feedback for the continuous learning and improvement of the ML model 232, completing the cycle of automated error recognition and recovery. As such, this described system and method constitute various embodiments of the invention, which provide an automated, intelligent, and efficient means of handling errors within self-service provisioning systems, thereby significantly improving system reliability and user satisfaction.

FIG. 4 illustrates a process flow for cryptographic hash signature architecture for error pattern recognition and automated recovery framework, in accordance with an embodiment of the disclosure. As shown in block 402, the process illustrated in FIG. 4 begins whereby the system initiates error handling by receiving live data, which includes encountering an error that requires processing and resolution. During this initial stage, live data is collected in real-time from various endpoints within the self-service system, such as user interfaces, system logs, or network traffic. The data acquisition engine is responsible for capturing this data, which may be in diverse formats such as structured logs or unstructured text, using APIs written in programming languages like Java or Python. These APIs facilitate the collection of data over secure network protocols like HTTPS, ensuring data integrity and confidentiality.

Once the error data is collected, it's immediately passed to a data pre-processing module. Here, any necessary data transformation occurs, including normalization and sanitization processes to standardize the live data for subsequent steps. This process may involve scripting languages like Python or Perl to manipulate text data or ETL (Extract, Transform, Load) tools for more structured data handling. The hardware infrastructure supporting this stage includes multi-core servers equipped with high-speed memory for quick data access and processing. These servers are typically configured in clusters to provide fault tolerance and load balancing, ensuring that the live data is processed efficiently and without delay. High-availability storage systems, possibly using technologies like RAID (Redundant Array of Independent Disks), ensure that the incoming data is preserved during the error handling process, preventing data loss and facilitating real-time processing. This allows the system to maintain a continuous flow of error detection and initiation of the resolution process, which is essential for minimizing the impact on system performance and the user experience.

As further illustrated in FIG. 4, indicated in block 404, the process continues whereby the checksum engine 304 generates a unique cryptographic hash signature for the received error, effectively converting the error data into a distinct checksum for efficient indexing and retrieval. This transformation is achieved by utilizing cryptographic algorithms such as SHA-256 or MD5, which are implemented through programming libraries available in languages like C++ or Python. These libraries take the pre-processed error data as input and output a fixed-length string of characters that serves as the unique identifier for that specific error.

The checksum creation process is sensitive to the slightest variation in input data, ensuring that each error generates a unique signature. This uniqueness is crucial for the subsequent pattern matching steps, where even minor discrepancies must be distinguishable. The checksums are then stored in a dedicated database, often a high-performance SQL or NoSQL database, optimized for fast read and write operations to support the rapid comparison operations that follow. The database is hosted on server hardware capable of high transaction throughputs, and the data schema is designed for quick access patterns with indexing on the checksum values.

From a system architecture standpoint, the checksum engine 304 operates on a distributed computing framework that allows it to scale horizontally, managing the load by distributing the checksum generation tasks across multiple nodes if the volume of live data errors spikes. This distribution may involve containerization technologies like Docker and orchestration with Kubernetes, which allow the deployment of isolated and reproducible environments for the checksum engine, ensuring consistency and reliability of the generated checksums across different computing environments. Additionally, the system's resilience is supported by redundant hardware and failover strategies, preventing any single point of failure from disrupting the error handling process.

As further illustrated in block 406, matching engine 306 compares the generated checksum against a database of stored checksums, such as checksum database 312, to identify if the error pattern is known. This step is critical for determining whether an immediate, pre-determined resolution can be applied to the error. The matching engine, which may be written in a high-performance language such as C++, or the like, for efficiency in pattern recognition tasks, leverages advanced algorithms to conduct a search through the checksum database.

The database, potentially utilizing a NoSQL system for its flexibility in handling various data types and structures, stores checksums along with metadata that describe previous errors, their patterns, and the actions taken to resolve them. When a match is found, the system retrieves the associated solution, which might include a sequence of corrective measures or a pointer to an automated script designed to resolve the error. To ensure that the matching engine can process the vast amount of checksum data rapidly, it is supported by high-throughput hardware capable of parallel processing. This might involve the use of GPU-accelerated databases or distributed computing resources to speed up the pattern recognition process. Additionally, the data architecture may be optimized for quick read and write operations, employing indexing strategies and in-memory data stores to reduce latency. If a match is not found in the checksum database 312, indicating an unfamiliar error pattern, the system may flag the error for further analysis or escalate it to the support team. In either case, the unmatched checksum and associated error data are logged for future reference, contributing to the machine learning model's training data for continuous system improvement.

As further illustrated in block 408, machine learning algorithms are utilized to analyze the checksum and recognize error patterns, enhancing the precision of matching and identification of potential solutions from historical data. This step is where the system's trained machine learning model 232, as outlined in the description of FIG. 2 and FIG. 3, is utilized. The trained machine learning model 232 has been previously trained using supervised learning techniques on historical error data, enabling it to discern patterns and correlations that might not be immediately apparent.

Upon receipt of a checksum, the machine learning model employs classification or regression algorithms to predict the likelihood of a match with existing patterns. The model may use a variety of techniques, such as neural networks for their ability to handle nonlinear relationships, decision trees for their interpretability, or support vector machines for their effectiveness in high-dimensional spaces. The algorithms are coded in languages suitable for machine learning tasks such as Python or R, leveraging libraries like TensorFlow or scikit-learn. As appreciated by one of ordinary skill in the art, the tasks run on specialized machine learning platforms equipped with the necessary computational power, such as servers with high-performance GPUs for parallel processing of complex mathematical operations intrinsic to ML tasks.

To further increase the efficiency of pattern recognition, the system may transform the error data into a feature space where machine learning algorithms can more easily identify patterns. This transformation may involve techniques like Principal Component Analysis (PCA) or autoencoders, which are designed to reduce dimensionality and highlight the most relevant aspects of the data for pattern recognition. The hardware backing this process includes not only the GPUs mentioned earlier but also potentially distributed data processing systems like Apache Hadoop or Spark. These platforms can handle the vast data sets required for ML training and inference, ensuring the ML model's performance is both fast and reliable. This aspect of the system is critical, as it allows the ML model to contribute meaningfully to the automated recovery framework, ultimately enhancing the system's self-healing capabilities.

As further illustrated in block 410, upon successful pattern recognition, the system triggers predefined automated execution scripts that correspond to the identified error pattern for immediate corrective action. This step is the execution phase where the theoretical understanding of the error translates into practical resolution. The system houses a library of scripts, possibly written in scripting languages like Python, PowerShell, or Shell, depending on the system's environment and the complexity of the tasks involved. Each script is designed to perform specific actions, such as resetting services, clearing caches, or adjusting configuration settings. The selection of the script is automated, guided by the output of the pattern recognition process from the previous step.

The execution of these scripts is managed by a script execution engine, which may be part of the broader rules engine 308 or a separate component designed to handle task automation. It ensures that the scripts are run in a secure environment, with error handling and logging built into the process to capture the outcome of each action. Supporting the execution of these scripts is the system's robust hardware infrastructure, designed to handle simultaneous operations across various nodes. For this, server clusters with load balancing and failover capabilities may be used to distribute the workload evenly. Additionally, virtualization technologies could be employed to isolate and manage script execution securely, preventing any adverse effects on the main system operations. Through this orchestrated process, the system's response to errors is not just reactive but proactive, as it applies solutions that have been proven to be effective in the past, thus reducing the system's downtime and improving overall reliability.

As further illustrated in block 410, upon successful pattern recognition, the system triggers predefined automated execution scripts that correspond to the identified error pattern for immediate corrective action. This step is the execution phase where the understanding of the error translates into practical resolution. The system houses a library of scripts, possibly written in scripting languages like Python, PowerShell, or Shell, depending on the system's environment and the complexity of the tasks involved. Each script is designed to perform specific actions, such as resetting services, clearing caches, or adjusting configuration settings. It is understood that the selection of the script is automated, guided by the output of the pattern recognition process from the previous step.

The execution of these scripts is managed by a script execution engine, which may be part of the broader rules engine 308, or a separate component designed to handle task automation, or the like. It ensures that the scripts are run in a secure environment, with error handling and logging built into the process to capture the outcome of each action. Supporting the execution of these scripts is the system's hardware infrastructure, as outlined in the description of FIG. 1, which is designed to handle simultaneous operations across various nodes. For this, server clusters with load balancing and failover capabilities may be used to distribute the workload evenly. Additionally, virtualization technologies could be employed to isolate and manage script execution securely, preventing any adverse effects on the main system operations. It is understood that through this orchestrated process, the resulting system's response to errors is not just reactive but proactive, as it applies solutions that have been proven to be effective in the past, thus reducing the system's downtime and improving overall reliability.

As further illustrated in block 412, the rules engine 308 processes the error by applying a set of predefined rules and algorithms, ensuring that the chosen solution aligns with system protocols and the nature of the error. The rules engine 308, which in some embodiments may be developed in a flexible programming language such as Python or Java, interprets the output from the matching engine to decide on the best course of action, or the like. As such, the rules engine 308 employs a logic processing system to evaluate the conditions associated with the error against a repository of rules that define various error handling strategies.

In some embodiments, these rules can be simple if-then statements, while in other embodiments the rules may comprise more complex decision trees that consider multiple attributes of the error, such as severity, frequency, impacted system components, and historical resolution success rates. As such, the rules are designed to be dynamic, allowing for updates as new types of errors are encountered and learned from, ensuring the system's adaptability. In some embodiments, the rules engine 308 is hosted on a scalable cloud infrastructure, while in other embodiments the rules engine 308 is hosted using on-premises servers equipped with fault tolerance mechanisms to guarantee uninterrupted operation. The rules engine 308 interfaces with a script execution environment that can run scripts across different operating systems and environments, which may involve using containerization technologies like Docker for isolated execution or orchestration tools such as Kubernetes for deployment and management.

The chosen corrective action is then programmatically executed through script automation tools, or the like. In some embodiments, these scripts are pre-written in scripting languages, which could include Bash for Unix-like systems or PowerShell for Windows environments. The automation ensures consistent and rapid application of the resolution, minimizing the need for manual intervention and accelerating the recovery process. One of ordinary skill will appreciate that this step is essential for maintaining system resilience and availability, as it allows the self-service system to correct issues with minimal downtime.

As further illustrated in block 414, the system updates the historical database of errors and exceptions 302 with new error data and resolution details, thus enriching the system's knowledge base for future occurrences. This database 302 acts as a repository that is continuously updated by the system, improving the system's accuracy and efficiency in error handling. One of ordinary skill in the art will appreciate that it is critical that the database is kept current and reflective of all encountered errors to ensure the machine learning model can learn and adapt. The update process includes recording the unique checksum, the nature of the error, the context in which it occurred, and the resolution steps taken. In some embodiments, this operation can be facilitated by database management systems like PostgreSQL or MongoDB, which offer the capability to handle large, evolving data sets with associated analytical operations. Additionally, the data may be timestamped and tagged with additional metadata, such as the system state and performance metrics during the error, to provide a richer context for future machine learning analysis.

The backend infrastructure supporting this step must ensure high write throughput and data integrity, or the like. In some embodiments, this may include employing write-ahead logging (WAL) for fault tolerance and data redundancy techniques to safeguard against data loss. Furthermore, in some embodiments, cloud-based solutions may be utilized to offer scalable and distributed database services, which can be particularly useful for handling the voluminous and growing dataset efficiently, or the like. The update mechanism not only stores the data but also organizes it in a manner that is conducive to quick retrieval and analysis. This might involve the use of indexing, partitioning, and database normalization practices. By doing so, the system ensures that the historical data can be easily accessed and utilized by the machine learning model for training and by the matching engine during the error resolution process.

As further illustrated in block 416, the system may verify the successful resolution of the error and feed the outcome back into the ML model to refine future error handling and pattern recognition capabilities, or the like. One of ordinary skill will appreciate that this verification step is vital for the closed-loop learning process that characterizes adaptive machine learning systems. The verification process typically involves both automated and manual checks to confirm the efficacy of the resolution. Automated checks might include system health checks and monitoring alerts that ensure system functionality is restored. These checks can be implemented using monitoring software written in languages like Go or Rust, which are known for their efficiency and low overhead in systems programming, or the like.

Additionally, in some embodiments, feedback mechanisms may be put in place to capture the outcome of the resolution process. This could include user confirmations or system uptime statistics that indicate a return to normal operations. The feedback data, structured to include success metrics and resolution timelines, is then relayed back to the trained ML model 232, which may employ reinforcement learning techniques to adjust its parameters based on the new data. The trained ML model 232, possibly using frameworks such as TensorFlow or PyTorch in some embodiments, is retrained or incrementally updated to incorporate the latest insights gained from the resolution outcomes. The underlying hardware and infrastructure for this process need to support high availability and real-time data processing capabilities. This can be achieved through dedicated ML accelerators, such as GPUs or TPUs, to expedite the retraining process, and the use of high-speed networking to minimize latency in feedback data transmission. Through this step, the system not only ensures that the error has been resolved but also uses the experience to improve its future performance, thereby enhancing the system's predictive accuracy and reducing the likelihood of recurring errors or facilitating faster resolution times.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. Patent Application No. | Title | Filed On |
|---|---|---|---|
| 15858US1.014033.4940 | To be assigned | INTEGRATED MULTIMODAL ARTIFICIAL INTELLIGENCE FRAMEWORK FOR AUTOMATED PROVISIONING SYSTEMS | Concurrently herewith |

What is claimed is:

1. A system for error pattern recognition and automated recovery, the system comprising:

a processing device; and a non-transitory storage device containing instructions which, when executed by the processing device, cause the processing device to:

receive live error data indicating an error within a self-service system;

generate a unique cryptographic hash signature based on the received live error data;

employ a machine learning algorithm to analyze the unique cryptographic hash signature and recognize an error pattern;

compare the unique cryptographic hash signature against a database of stored checksums to identify if the error pattern is known;

trigger a predefined automated execution script corresponding to the error pattern for immediate corrective action;

process the error pattern via applying a set of predefined rules to ensure a chosen solution aligns with system protocols;

update a historical database of errors and exceptions with new error data and resolution details; and verify a successful resolution of the error pattern and feeding back an outcome into the machine learning model to refine future error handling and pattern recognition capabilities.

2. The system of claim 1, wherein the system is further configured to utilize a rules engine for applying the set of predefined rules, wherein the rules engine processes the error based on a context or characteristic of the error to select an appropriate resolution method.

3. The system of claim 1, wherein the machine learning algorithm includes at least one of supervised learning, unsupervised learning, semi-supervised learning, or reinforcement learning to facilitate the recognition of the error pattern and identification of resolution strategies.

4. The system of claim 1, wherein the system is further configured to employ a data pre-processing engine to standardize and prepare live data for analysis, the data pre-processing engine performing tasks including normalization, cleaning, and transformation of the live data.

5. The system of claim 1, wherein the automated execution scripts are implemented in at least one scripting language selected from the group consisting of Bash, Power-Shell, and Python, and are designed to interact with various system components across different operating systems.

6. The system of claim 1, wherein the system is further configured to maintain the database of stored checksums via adding new checksums associated with newly encountered errors and resolution outcomes of the newly encountered errors.

7. The system of claim 1, wherein the system includes a feedback mechanism configured to:
capture data on success or failure of applied resolution strategies;
analyze the captured data on the success or the failure of the applied resolution strategies; and
utilize the captured data on the success or the failure of the applied resolution strategies to inform future error handling.

8. A computer program product for error pattern recognition and automated recovery, the computer program product comprising a non-transitory computer-readable medium comprising code causing an apparatus to:
receive live error data indicating an error within a self-service system;
generate a unique cryptographic hash signature based on the received live error data;
employ a machine learning algorithm to analyze the unique cryptographic hash signature and recognize an error pattern;
compare the unique cryptographic hash signature against a database of stored checksums to identify if the error pattern is known;
trigger a predefined automated execution script corresponding to the error pattern for immediate corrective action;
process the error pattern via applying a set of predefined rules to ensure a chosen solution aligns with system protocols;
update a historical database of errors and exceptions with new error data and resolution details; and
verify a successful resolution of the error pattern and feeding back an outcome into the machine learning model to refine future error handling and pattern recognition capabilities.

9. The computer program product of claim 8, wherein the code further causes the apparatus to: utilize a rules engine for applying the set of predefined rules, wherein the rules engine processes the error based on a context or characteristic of the error to select an appropriate resolution method.

10. The computer program product of claim 8, wherein the machine learning algorithm includes at least one of supervised learning, unsupervised learning, semi-supervised learning, or reinforcement learning to facilitate the recognition of the error pattern and identification of resolution strategies.

11. The computer program product of claim 8, wherein the code further causes the apparatus to: employ a data pre-processing engine to standardize and prepare live data for analysis, the data pre-processing engine performing tasks including normalization, cleaning, and transformation of the live data.

12. The computer program product of claim 8, wherein the automated execution scripts are implemented in at least one scripting language selected from the group consisting of Bash, PowerShell, and Python.

13. The computer program product of claim 8, wherein the code further causes the apparatus to: maintain the database of stored checksums via adding new checksums associated with newly encountered errors and resolution outcomes of the newly encountered errors.

14. The computer program product of claim 8, wherein the code further causes the apparatus to:
capture data on success or failure of applied resolution strategies;
analyze the captured data on the success or the failure of the applied resolution strategies; and
utilize the captured data on the success or the failure of the applied resolution strategies to inform future error handling.

15. A method for error pattern recognition and automated recovery, the method comprising:
receiving live error data indicating an error within a self-service system;
generating a unique cryptographic hash signature based on the received live error data;
employing a machine learning algorithm to analyze the unique cryptographic hash signature and recognize an error pattern;
comparing the unique cryptographic hash signature against a database of stored checksums to identify if the error pattern is known;
triggering a predefined automated execution script corresponding to the error pattern for immediate corrective action;
processing the error pattern via applying a set of predefined rules to ensure a chosen solution aligns with system protocols;
updating a historical database of errors and exceptions with new error data and resolution details; and
verifying a successful resolution of the error pattern and feeding back an outcome into the machine learning model to refine future error handling and pattern recognition capabilities.

16. The method of claim 15, wherein the method further comprises:
utilizing a rules engine for applying the set of predefined rules, wherein the rules engine processes the error based on a context or characteristic of the error to select an appropriate resolution method.

17. The method of claim 15, wherein the machine learning algorithm includes at least one of supervised learning, unsupervised learning, semi-supervised learning, or reinforcement learning to facilitate the recognition of the error pattern and identification of resolution strategies.

18. The method of claim 15, wherein the method further comprises: employing a data pre-processing engine to standardize and prepare live data for analysis, the data pre-processing engine performing tasks including normalization, cleaning, and transformation of the live data.

19. The method of claim 15, wherein the automated execution scripts are implemented in at least one scripting language selected from the group consisting of Bash, PowerShell, and Python, and are designed to interact with various system components across different operating systems.

20. The method of claim 15, wherein the method further comprises:

capturing data on success or failure of applied resolution strategies;

analyzing the captured data on the success or the failure of applied resolution strategies; and utilizing the captured data on the success or the failure of applied resolution strategies to inform future error handling.

* * * * *